United States Patent
Green

(10) Patent No.: US 6,741,985 B2
(45) Date of Patent: May 25, 2004

(54) DOCUMENT RETRIEVAL SYSTEM AND SEARCH METHOD USING WORD SET AND CHARACTER LOOK-UP TABLES

(75) Inventor: Robin A. R. Green, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/918,592

(22) Filed: Jul. 31, 2001

(65) Prior Publication Data

US 2002/0129012 A1 Sep. 12, 2002

(30) Foreign Application Priority Data

Mar. 12, 2001 (CA) .............................................. 2340531

(51) Int. Cl.[7] .............................................. G06F 17/30
(52) U.S. Cl. .................................. 707/5; 707/9; 707/10
(58) Field of Search ..................... 707/1–10, 100–104.1

(56) References Cited

U.S. PATENT DOCUMENTS

| | | | |
|---|---|---|---|
| 5,303,361 A | 4/1994 | Colwell et al. .............. | 395/425 |
| 5,613,110 A | 3/1997 | Stuart .......................... | 395/601 |
| 5,915,249 A * | 6/1999 | Spencer .......................... | 707/5 |
| 5,987,459 A | 11/1999 | Swanson et al. ................ | 395/6 |
| 6,032,151 A | 2/2000 | Arnold et al. .............. | 707/103 |
| 6,070,160 A | 5/2000 | Geary ........................... | 707/4 |
| 6,564,211 B1 * | 5/2003 | Andreev et al. ................ | 707/3 |

FOREIGN PATENT DOCUMENTS

| | | |
|---|---|---|
| EP | 0380239 A2 | 8/1990 |
| JP | 6215029 A | 8/1994 |

OTHER PUBLICATIONS

Proceedings 7th International Symposium on String Processing and Information Retrievel, IEEE 2000, IX+261 ppg.

(List continued on next page.)

*Primary Examiner*—Shahid Alam
*Assistant Examiner*—Jean Bolte Fleurantin
(74) *Attorney, Agent, or Firm*—David A. Mims, Jr.

(57) ABSTRACT

A computer-operated document retrieval system includes a lexicon of words contained in system documents, and a document look-up table that relates words by unique word numbers to the documents. A word look-up table identifies sets of words with common characteristics, specifically prefix value and word length, and a character look-up table identifies whether any word contains a specified character. A target set generator accesses the word look-up table to compose a target word set with characteristics corresponding to the search string. A refining module reduces the target set by selecting a set of characters from the search string, and accessing the character look-up table to identify which target words use the character set. The character look-up table is a boolean array with one bit elements that are processed in groups whose size corresponds to the maximum bit processing count of the computer, effectively culling non-matching words simultaneously. A string comparison module determines whether any word remaining in the target set matches the search string. The system quickly executes various searches, including prefix, exact match, wildcard, and fuzzy searches.

13 Claims, 7 Drawing Sheets

OTHER PUBLICATIONS

"Block Addressing Indices for Approximate Text Retrieval", Y.R. Baeza et al, Journal of the American Society for Information Science, vol. 51, No. 1, pp. 69–82, Jan. 1, 2000.

"New Indices for Japanese Text", N. Noguchi et al, Transactions of the Information Processing Society of Japan, vol. 39, No. 4; pp. 1098–1107, Apr. 1998.

"Tries for Approximate String Matching", H. Shang et al., IEEE Transactions on Knowledge and Data Engineering, vol. 8, No. 4, pp. 540–547, Aug. 1996.

Pattern–matching and text–compression algorithms, M. Crochemore et al., ACM Computing Surveys, vol. 28, No. 1, pp. 39–41, Mar. 1996.

Optimal on–line search and sublinear time update in string matching, P. Ferragina et al., Proceedings. 36th Annual Symposium on Foundations of Computer Science (Cat. No. 95CB35834), pp. 604–612, Published: Los Alamitos, CA, USA, Oct. 1995, xiii+735 pp.

IBM TDB "Intelligent Searching of Dynamic Databases", vol. 41, No. 1, Jan. 1998, pp. 647–650.

* cited by examiner

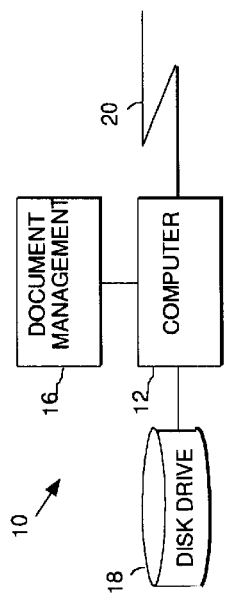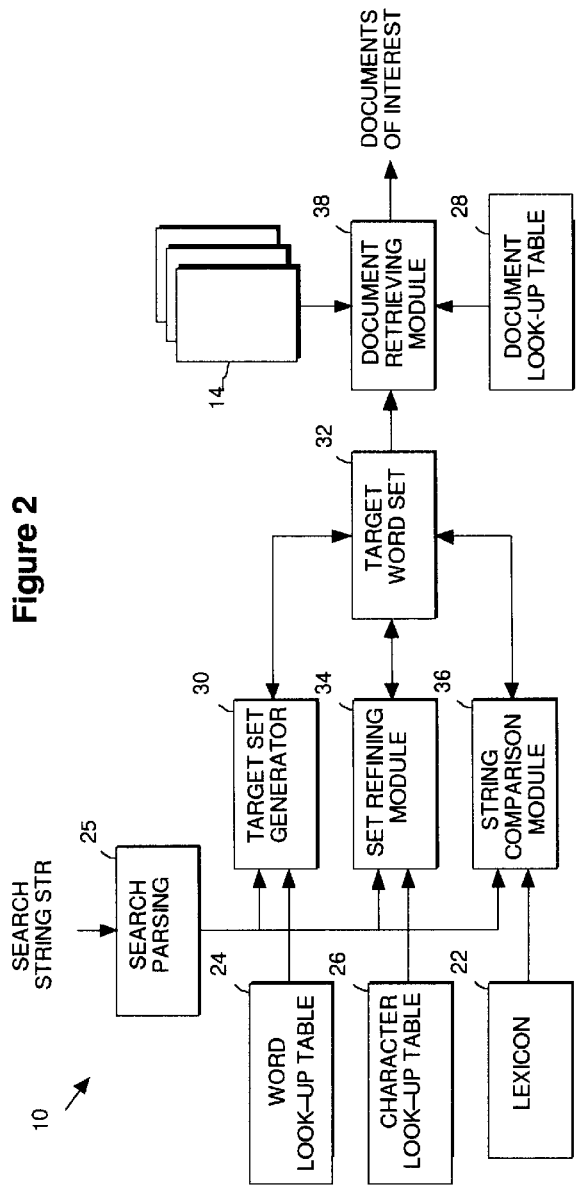

| a2 | 2 | 2 |
| --- | --- | --- |
| a3 | 1 | 1 |
| b5 | 3 | 3 |
| d3 | 4 | 4 |
| d6 | 5 | 5 |
| e4 | 6 | 6 |
| f3 | 7 | 7 |
| j6 | 8 | 8 |
| l4 | 9 | 9 |
| n5 | 10 | 10 |
| o4 | 11 | 11 |
| q6 | 12 | 12 |
| r3 | 13 | 13 |
| r3 | 14 | 15 |
| r7 | 15 | 15 |
| s3 | 16 | 18 |
| s3 | 19 | 19 |
| t3 | 20 | 20 |
| t7 | | |

24

| 1 | and | a3 |
| --- | --- | --- |
| 2 | as | a2 |
| 3 | brown | b5 |
| 4 | dog | d3 |
| 5 | daniel | d6 |
| 6 | east | e4 |
| 7 | fox | f3 |
| 8 | jumped | j6 |
| 9 | lazy | l4 |
| 10 | named | n5 |
| 11 | over | o4 |
| 12 | quick | q6 |
| 13 | ran | r3 |
| 14 | red | r3 |
| 15 | rapidly | r7 |
| 16 | sam | s3 |
| 17 | sun | s3 |
| 18 | set | s3 |
| 19 | the | t3 |
| 20 | towards | t7 |

22

- PARSE DOCUMENTS — 40
- BUILD DOCUMENT LOOK-UP TABLE — 44
- BUILD LEXICON — 42
- SORT LEXICON ON PREFIX VALUE AND WORD LENGTH — 46
- ASSIGN CONSECUTIVE WORD NUMBERS — 48
- BUILD WORD LOOK-UP TABLE — 50
- BUILD CHARACTER LOOK-UP TABLE — 52

Figure 6

|   | a n d s | b r o w n s | d a n e n g | i a s l t | a f s o t x | f p e z d | p a m e y d | a m z e d r | m v e c k | v i r a n d | i r r e l y m n | r a p i d s u e s | s s h e t | s t r d s | t o w a r d s |
|---|---|---|---|---|---|---|---|---|---|---|---|---|---|---|---|
| a | 1 1 0 0 | 1 1 0 0 | 1 1 0 0 | 1 | 0 | 1 | 1 | 0 | 0 | 1 |
| b | 0 0 1 0 | 0 0 0 0 | 0 0 0 0 | 0 | 0 | 0 | 0 | 0 | 0 | 0 |
| c | 0 0 0 0 | 0 0 0 0 | 0 0 1 0 | 0 | 0 | 0 | 0 | 0 | 0 | 0 |

(Matrix 26 — character co-occurrence table, rows a–z × 18 columns)

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 54 | 0 | 1 | 0 | 0 | 0 | 1 | 1 | 0 | 1 | 0  | 1  | 0  | 0  | 1  | 0  | 0  |
| 56 | 0 | 0 | 0 | 0 | 0 | 1 | 1 | 0 | 0 | 0  | 1  | 0  | 0  | 0  | 0  | 0  |
| 58 | 0 | 0 | 0 | 0 | 0 | 1 | 1 | 0 | 0 | 0  | 1  | 0  | 0  | 0  | 0  | 0  |

0     6     2     0

DOCUMENT RETRIEVAL SYSTEM AND SEARCH METHOD USING WORD SET AND CHARACTER LOOK-UP TABLES

FIELD OF THE INVENTION

The invention relates generally to storage and retrieval of text-containing documents, and more specifically, to matching a search string to words extracted from documents.

BACKGROUND OF THE INVENTION

The invention has particular but not exclusive application to document retrieval systems used on the World-Wide Web ("Web"). There is currently a wide-spread need for compact search engines and databases that quickly identify and retrieve documents, such as Web pages, in response to search queries. Such queries are usually directed to finding documents that contain specific words.

Various aspects of such document retrieval systems are well known. It is common practice, for example, to parse documents and to create a lexicon containing words extracted from the documents. To reduce storage and simplify operation, words in the lexicon are assigned unique identifying numbers, and a document look-up table uses such numbers, rather than character strings, to identify documents that contain particular words. Various types of searches are known, including exact match searches, prefix searches, and wildcard searches. Also of interest are searches referred to as "fuzzy" searches, which identify terms loosely matching a search string.

The invention is concerned primarily with the word matching process underlying such systems. Various techniques are known for matching words with search strings. A string can be compared sequentially with each word in a lexicon to identify a matching word set but such a process is very time consuming. A complete indexing of characters in each word permits very fast exact match and prefix searches but places considerable demand on disk space. Numerous techniques are known for partial indexing of word lists on prefix values (starting characters) or word length with a view to reducing the number of words that must actually be compared with a search string. A very well known search technique involves use of a binary tree. The search algorithm associated with a binary tree very quickly reduces the number of lexical nodes that must be compared with a search string. However, the search algorithm repeatedly accesses a disk drive storing the tree structure as nodes are traversed, which severely impairs retrieval time. Another problem is that prior art methods do not necessarily lend themselves to performing various searches, including wildcard and fuzzy searches, quickly and effectively.

BRIEF SUMMARY OF THE INVENTION

In one aspect, the invention provides a document retrieval system that retrieves documents in response to a search string identifying one or more words expected to be found in documents of interest. The system includes a lexicon that stores a collection of words extracted from the documents and associates each word with an identifying number. A document look-up table relates the word numbers to documents containing the associated words to permit identification and retrieval of appropriate documents. A word look-up table groups the words of the lexicon into sets with common characteristics (preferably prefix values and length), and a character look-up table identifies whether any word in the lexicon contains a specific character. In response to a search string, set generating means access the word look-up table to identify a set of target words whose characteristics correspond to characteristics of the search string. Set refining means then reduce the target set by selecting a set of characters from the search string, accessing the character look-up table to identify whether each target word uses the selected character set, and excluding from the target set those words that do not contain either the entire character set or a predetermined number of the selected characters. String comparison means then access the lexicon to perform a direct comparison of the words remaining in the target set with the search string.

The search process associated with the system has several advantages. The preliminary target set is normally a small subset of the lexicon, which reduces relatively time-consuming direct comparison of words with the search string. The set refining process further reduces the target set, culling words that do not use the same character set as the search string or a subset of those characters. Although character sequencing and frequency are important factors in predicting a word match, the requirement for a common character set and equal or similar word lengths results in a high probability that any word remaining in the refined target set is a close match for the search string. In instances where no matching word exists, the result is often reported before any direct string comparisons are performed. Moreover, the search process lends itself to implementation of various searches, including fuzzy and wildcard searches, as will be apparent from the description of preferred embodiments.

The character look-up table can be conveniently implemented as a compact boolean array whose dimensions correspond to character value and word number and whose entries consist of a single bit. Word numbers are preferably assigned in such a manner that the word look-up table returns a target set consisting of consecutive word numbers for each set of words in the lexicon with common characteristics. This permits the set refining process to take advantage of the maximum bit processing count available from a digital processor when accessing the character look-up table, effectively culling groups of words simultaneously from the target set. Using a conventional 32-bit processor, words can potentially be eliminated in 32-member sets. Since boolean operations are inherently fast and since word numbers can be culled simultaneously according to a processor's maximum bit processing count, a very significant speed advantage is obtained.

The term "set" as used in this specification in respect of search criteria, word lengths, matching criteria and values, word characteristics, and search string characteristics should be understood as identifying a set consisting of one or more members. Word sets and word number sets should be understood as potentially being null or empty. The term "target" as applied to a set of words or a set of word numbers identifies a set expected to contain, but not necessarily containing, a word or a word number associated with a word that will match a search string. The word "common" as used in this specification in respect of a set of characteristics, prefix values, word lengths and the like, refers to a specific value shared by a set of items.

The specification refers to the "excluding" of word numbers from target sets. Such exclusion can take different forms depending in large measure on how the target set is represented. For example, when forming a preliminary target set, selecting upper and lower range numbers to define the target set excludes other words and word numbers identified in the lexicon. During set refining, the target set may be represented with a string of bits, each bit corresponding to a different word number in the target set, and a word number may be excluded by setting the corresponding bit to 0. When converting the bit string representation of the target set to a list of word numbers, word numbers are effectively excluded by recording only those numbers associated with words likely to match a search string. Accordingly, the term "excluding" and comparable terms as used in respect of word numbers associated with a target set should be understood as encompassing any manner of identifying that a word number is not, or no longer remains, a member of the target set.

Other aspects of the invention and associated advantages will be described with reference to preferred embodiments, and various aspects of the invention will more specifically defined in the appended claims.

DESCRIPTION OF THE DRAWINGS

The invention will be better understood with reference to drawings in which:

FIGS. 1 and 2 are diagrammatic representations of a document retrieval system including a disk drive that store a system lexicon and various look-up tables;

FIG. 6 diagrammatically illustrates a character look-up table corresponding to the lexicon of FIG. 4;

FIG. 7 is a diagrammatic representation of bit strings showing how multiple words can be culled simultaneously from a target word set;

Figures 3, 4, 5:
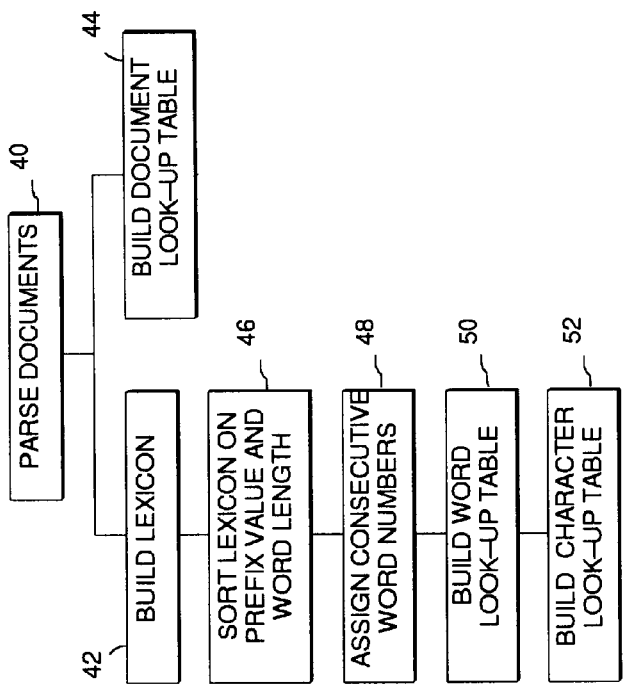
FIG. 3 is a flowchart showing steps in the building of a lexicon and the tables associated with the system.
FIG. 4 diagrammatically illustrates a simple version of the lexicon.
FIG. 5 diagrammatically illustrates a word look-up table corresponding to the lexicon of FIG. 4.

In the flowcharts, the direction of program flow is down the page and away from decision boxes unless otherwise indicated with arrows.

DESCRIPTION OF PREFERRED EMBODIMENTS

Reference is made to FIGS. 1 and 2 which diagrammatically illustrate a document retrieval system 10 operated by a computer 12 to retrieve documents 14 stored on a conventional hard disk 18. The system 10 includes document management software 16 that creates and stores various tables on the disk 18 and then uses the tables to retrieve documents in response to search queries. The computer 12 is coupled by a telecommunications link 20 to the Web to receive such queries from remote users and to transmit documents to the users.

An overall description of the system 10 will be provided but emphasis will be placed on novel aspects of the system 10, specifically how word numbers sets are manipulated to quickly narrow a set of target words that potentially match a search string. The term "search string" is sometimes used to identify an entire query that consists of multiple search terms and operators. For purposes of this specification, however, a search string should be understood as a single search term intended to identify a set of words (one or more). To simplify explanation, the description will often refer to culling or manipulation of target words rather than the word numbers associated with such words. It should be understood, however, that the system 10 operates on word numbers except where direct string comparisons are required.

The system 10 includes a lexicon 22 stored on the disk 18. The lexicon 22 contains words extracted from the collection of documents 14 and associates each word with a unique identifying number. When a search query is executed, word number sets are generated for each term in the query. The word number sets are ultimately passed to a document retrieving module 38 that accesses a document look-up table 28, stored with the lexicon 22 on the disk 18, whose function is to relate word numbers to documents containing the associated words. The document retrieving module 38 determines which documents contain words satisfying any relationship specified by a complex query, and then selectively retrieves and transmits identified documents to a searcher. The document retrieving module 38 and the document look-up table 28 are conventional and will not be described further.

The document management software 16 includes a search parsing module 25 that parses a query in a conventional manner to identify search terms and the type of search required for each search term. A search type may be specified with a code and delimiting characters preceding a search string. A more common approach for Web site search engines is to incorporate search instructions directly into the search string, using characters outside the character set used for word identification. For example, a trailing asterisk "*" may specify a prefix search. One or more embedded underscores "_" or question marks "?" may serve as "wildcards", identifying that a matching word can contain any character at the position of a wildcard. Any method of specifying a search type is acceptable for purposes of the invention.

The document management software 16 uses a three-stage process to identify a set of words that match a search string. First, a target set generator 30 accesses a word look-up table 24 to identify a preliminary set 32 of words whose characteristics correspond to those of the search string. The preliminary target set 32 is normally a small subset of the entire lexicon 22 but may still contain many non-matching entries. Next, a set refining module 34 accesses a character look-up table 26 to cull the target set 32 of any words that do not use the same character set as the search string or some subset of those characters. Finally, a string comparison module 36 compares each remaining word directly with the search string to conclusively identify matches.

The manner in which the lexicon 22, word look-up table 24 and character look-up table 26 are built simplifies the operation of the various modules and reduces execution time. FIG. 3 shows the principal steps in assembling the system's files and tables for the collection of documents 14. Although document parsing 40 is shown separate from building of the lexicon 22 (step 42) and the document look-up table 28 (step 44), those skilled in the art will appreciate that the tables may be constructed at least in part as words are extracted from the documents 14. Once parsing 40 is complete, the lexicon 22 is sorted (step 46) according to word prefix value and length, the parameters later used to identify a preliminary target set 32 corresponding to a search string. The words of the lexicon 22 are sorted "primarily" according to prefix value and "secondarily" according to length; that is, the lexicon 22 is ordered according to prefix value, preferably on just the starting character of each word, and for any given prefix value, corresponding words are further ordered according to length. The sorted words are then assigned consecutive word numbers (step 48). If the lexicon 22 is implemented, for example, as a string array, the unique number associated with each word is not actually stored but is simply defined by the word's position in the array.

FIG. 4 provides a very simple example of the system lexicon 22 for purposes of explanation. It will be assumed that the system 10 uses only a limited character set, namely, alphabetic characters "a" to "z", and that upper case letters "A" to "Z" are mapped into corresponding lower case values to make searches case-independent. It will also be assumed that the system 10 currently stores only a single document containing the following text: "The quick brown fox named Sam jumped over the lazy dog named Daniel and ran rapidly towards the east as the red sun set." Parsing of the text produces the following list of twenty unique words: "the", "quick", "brown", "fox", "named", "sam", "jumped", "over", "lazy", "dog", "daniel", "and", "ran", "rapidly", "towards", "east", "as", "red", "sun", and "set."

FIG. 5 shows an implementation of the word look-up table 24 corresponding to the simple lexicon 22 of FIG. 4. The purpose of the word look-up table 24 is effectively to group words in the lexicon 22 into sets with common characteristics, specifically a common starting character and length. Moreover, the word look-up table 24 is configured so that each word set is represented with consecutive word numbers. Referring to FIG. 4, it will be noted that each entry in column one of the word look-up table 24 identifies a specific starting character and a specific word length. Corresponding entries in columns two and three identify lower and upper bounds, respectively, for a range of consecutive word numbers whose associated words begin with the specified character and conform to the specified word length. For example, the character-length value "a2" in column one identifies a set of two-character words that begin with the letter "a." The corresponding entries in columns two and three define the associated word number range 2 to 2, which identifies a single-member set consisting of the word "as." For the character-length entry "s3", the word look-up table 24 identifies consecutive word numbers 16–18 which identify a three-member set consisting of the words "sam", "sun" and "set."

The word look-up table 24 is sorted on the character-length values of column one, primarily on starting character and secondarily on length. The sorting expedites location of any specified character-length value in a conventional manner. More significantly, however, such sorting allows quick identification of a set of word numbers, specifically a set of consecutive word numbers, that represent words with the same starting character but different lengths, as might be required, for example, in a prefix search. A prefix search is of course matched by any word that begins with a specified search string. The minimum length of any matching word is consequently the string length, and the maximum length is bounded by the longest word in the lexicon 22 (whose length can be identified and stored during parsing 40). To select a starting word number, column one of the table is scanned downward until the first character-length value corresponding to the starting character of the search string and a length within the required length range is identified. The starting or lower word number is identified in column two of the row containing the identified character-length value. To select the last or upper word number, column one is scanned downward until the last character-length value that corresponds to the starting character of the search string and to a length within the required length range is identified. The upper word number is then identified in column three. If only a single entry satisfies the character-length criteria, the upper and lower word numbers are identified in columns two and three of that entry.

Examples of such range identification will be provided with reference to the sample word look-up table 24 of FIG. 4. The longest words in the lexicon 22 are "towards" and "rapidly", both of which have 7 characters. Assuming that a prefix search is required for the string "ref", whose character-length value is "r3", the word look-up table 24 is scanned for all entries in the range "r3" to "r7." The first column of the word look-up table 24 is scanned downward until the character-length value "r3" is identified. Scanning across to column two, the value 13 identifies the required lower word number. Column one is again scanned downward until the last conforming character-length value is identified, namely, "r7." The upper word number for the prefix search, namely 15, is identified in column three of the row associated with "r7". Assuming that a prefix search is directed to the string "bart", the word look-up table 24 is scanned for character-length entries in the range "b4" to "b7." Only a single character-length value entry lies within the specified range, namely, "b5." Columns two and three identify both the lower and upper word numbers for the associated word number set as 3. The set is consequently a single-member set containing the word "brown." Assuming that a prefix search is required for the search string "cat", the table is scanned for character-length values in the range "c3" to "c7." Since no matching entry is found, the preliminary word set is empty (no word in the lexicon 22 matches the search string).

The character-length entries of column one of the word look-up table 24 have been assigned symbolic values to make the table more easily understood. In practice the character-length values will be numeric, and appropriate values can be selected by mapping the value of each starting character and word length pair in a conventional manner into a unique index number. In such a mapping, the value of the starting character may be encoded into higher order bits of the index number and the word length, into lower order bits so that a single sorting of the table on column one results in both a primary sorting on character value and a secondary sorting on word length.

The word look-up table 24 is preferably implemented as a pair of data structures. One structure contains the lower and upper range numbers shown in columns two and three of FIG. 5. The other structure, which corresponds to the first column, may contain pointers to the range number pairs. A single two-column array can be used to hold the range numbers in which case character-length values are not actually stored but are instead defined by the position of the range numbers in the array. Although an array allows quick data retrieval, the array would have to be dimensioned to accommodate an exhaustive range of character-length values, making poor use of storage. The building of the word look-up table 24 (step 50), including the method of sorting, is conventional. The process 50 may simply involve stepping successively through the entries of the sorted lexicon 22, identifying when character-length values change, and then recording upper and lower word numbers and a pointer to their location.

A version of the character look-up table 26 corresponding to the lexicon 22 of FIG. 4 is diagrammatically illustrated in FIG. 6. The character look-up table 26 is implemented as a two-dimensional boolean array. One dimension of the array corresponds to numeric values representing the characters "a" through "z", and the other, to word numbers in the lexicon 22. To make the character look-up table 26 more easily understood, the words of the exemplary lexicon 22 have been shown in place of their word numbers in FIG. 6. The character lookup table 26 is very compact, using only 1 bit for each entry. In keeping with conventional practice, a bit value of 1 is used to identify the logic value "true" and a bit value of 0, the logic value "false" (although such an assignment of truth values is not strictly required for purposes of the invention). Each entry in the array identifies whether a specific character is found in a specific word. Consider, for example, the word "named" which appears at column 10. Column 10 is filled with zeroes except at rows corresponding to the letters of the word which, in alphabetic order, are "a", "d", "e", "m" and "n." The building of the character look-up table 26 (step 52 in FIG. 3) simply involves examining the characters in each word of the lexicon 22 and entering values in the character look-up table 26 against the associated character values and word number. It should be noted that sets of words with common character-length values are identified in adjacent columns of the character look-up table 26 as are sets of words with a common starting character but different lengths. This results from the assignment 48 of word numbers after sorting 46 of the lexicon 22, and permits words to be processed simultaneously, as will explained below.

Figure 8:
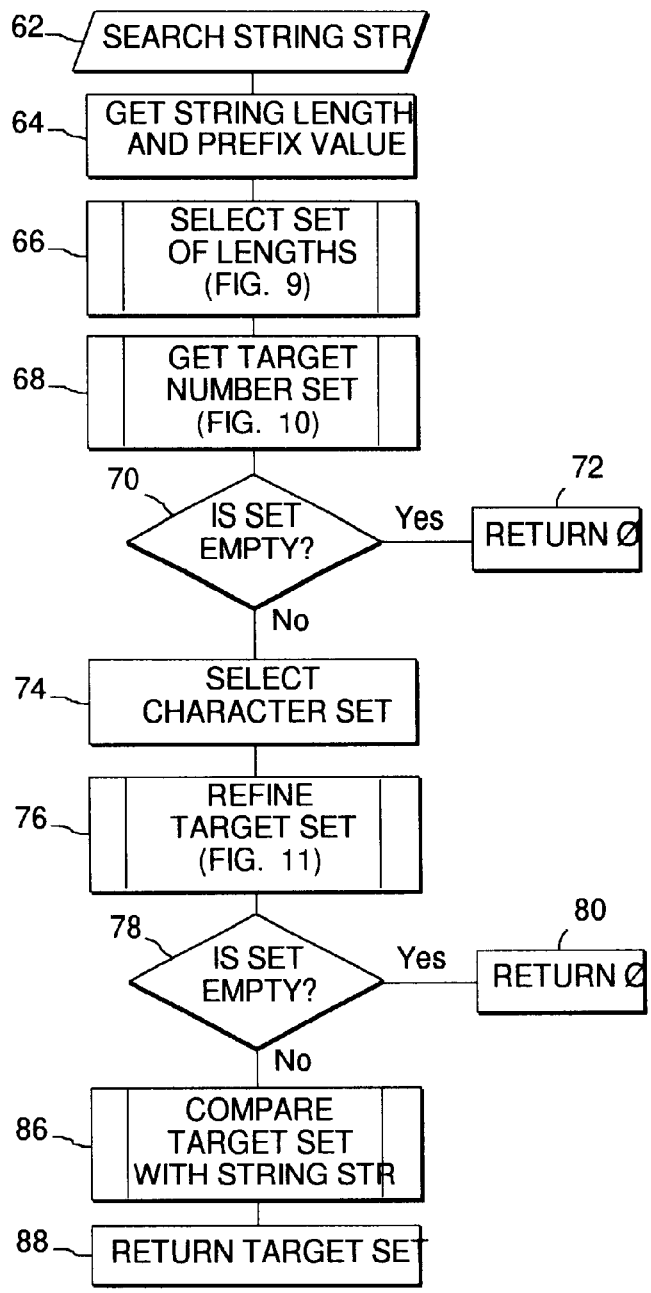
FIG. 8 is a flowchart illustrating a search procedure implemented by the document retrieval system.

FIG. 8 diagrammatically illustrates the procedure the system 10 follows to implement various word searches, including exact match, prefix, wildcard and fuzzy searches. A search is initiated when a search string STR is received (step 62). First, the prefix value (in this embodiment just the value of the string's starting character) and the length of the string STR are identified (step 64). A set of word lengths is then selected that corresponds to the length of the search string STR and reflects the type of search required (procedure 66). The identified starting character and the set of word lengths are then used by the target set generator 30 to access the word look-up table 24 and compose a word number set (procedure 68) whose associated words are reasonable candidates for matching to the search string STR. If the set is empty, the procedure terminates and returns a null set, designated "0" in the drawings (steps 70, 72). The null set identifies that the collection of documents 14 contains no word matching the search string STR.

If the target set 32 is not empty, a character set is selected from among the characters of the search string STR (step 74). The character set is identified in FIG. 11 as an m-member whose character values are designated $CHAR_1$ to $CHAR_m$. The character set will normally consist of all characters in the search string except embedded characters used to instruct the type of search (such as wildcards or prefix identifiers) and the starting character which is effectively matched when the word look-up table 24 is accessed to identify the preliminary target set 32. The set refining module 34 uses the selected character set to cull word numbers from the target set 32 according to the degree to which associated words use or do not use the character set (procedure 76). If a smaller set of characters is selected, fewer non-matching words will be culled from the target set 32. If the refined target set 32 is empty, a null set is once again returned (steps 78, 80).

If the refined target set 32 is not empty, the string comparison module 36 compares each word remaining in the target set 32 directly with the search string STR, conclusively identifying matching words and excluding any non-matching words still associated with the target set 32 (procedure 86). For a fuzzy search, the string comparison module 36 receives the target set 32 together with an array that associates each target word number with a match value or score, and the comparison of the search string STR with the target words is conducted according to an algorithm specific to fuzzy searches. Such algorithms are well known and will not be described. The target set 32, which may at this stage be reduced to a null set, is then returned for document retrieval (step 88). Further details regarding the search procedure will be provided with reference to FIGS. 9–11.

Figure 9:
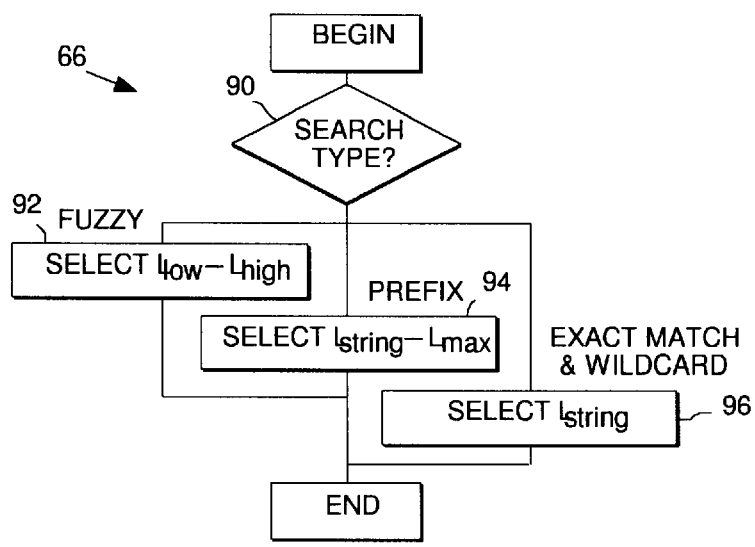
FIG. 9 is a flowchart illustrating how a set of word lengths is selected for purposes of identifying a preliminary set of target words.

FIG. 9 illustrates the procedure 66 for selecting a set of lengths for purposes of creating the preliminary target set 32. The procedure 66 branches according to search type (step 90). If an exact match or wildcard search is specified, the length set identifies only one value, the length of the search string, designated $L_{string}$ (step 96). A prefix search on the other hand can be matched by any word in the lexicon 22 that begins with the search string. The minimum length of any matching word in the lexicon 22 is consequently the string length $L_{string}$, and the maximum length is bounded by the length of the longest word in the lexicon 22, designated $L_{max}$ in FIG. 9. These values are consequently used to define the length set (step 94). For purposes of a fuzzy search, the search string STR is treated as a complete word, and words loosely matching the search string are required. A range of word lengths may be selected with a lower limit ($L_{low}$ in FIG. 9) less than the string length and an upper limit ($L_{high}$ in FIG. 9) greater than the string length (step 92). The exact manner of setting a length range for the fuzzy search will ultimately be determined by the search designer.

Figure 10:
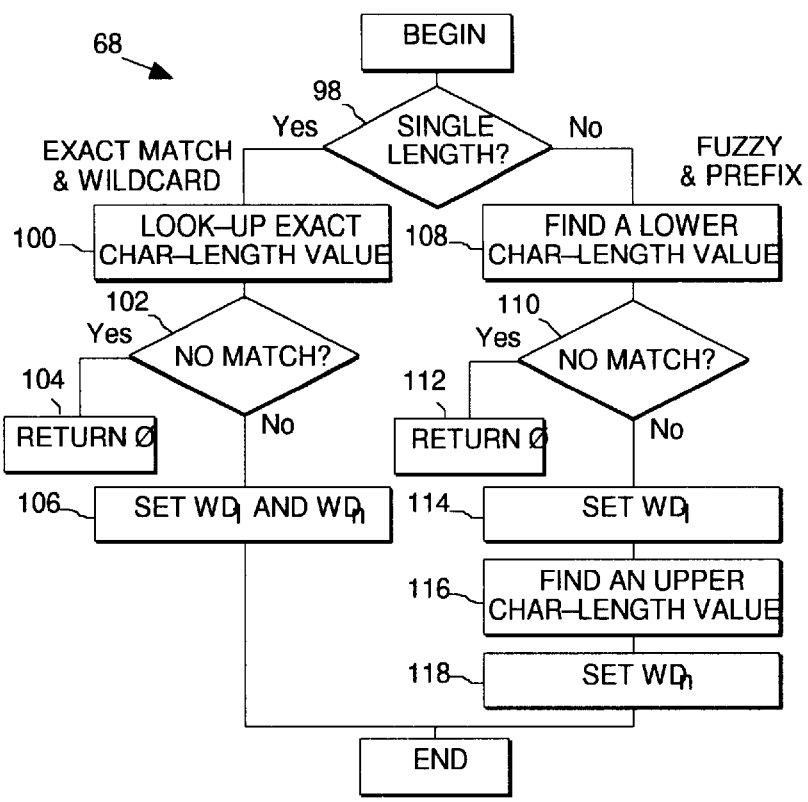
FIG. 10 is a flowchart illustrating how a character set is selected from a search string for purposes of refining the target set.

FIG. 10 illustrates the procedure 68 for selecting the preliminary target set 32 in response to the selected length set. The procedure 68 branches (step 98) according to whether the set of lengths selected by the procedure 66 consists of a single length. If a single length is specified (for example, in exact match and wildcard searches), the word look-up table 24 is accessed to find the starting character-length value of the search string in column one (step 100). If no matching entry is found, there are no words in the lexicon 22 with the same starting character and length as the search string, and accordingly the preliminary target set 32 is identified as null (steps 102, 104). Otherwise, a lower word number (designated $WD_1$ in the flowcharts) is selected from column two of the word look-up table 24, and an upper word number (designated $WD_n$ in the flowcharts), from column three (step 106).

If a range of lengths is specified (as for prefix and fuzzy searches), the target set generator 30 scans downward along column one of the word look-up table 24 to identify a lower character-length value conforming to the starting character of the search string (step 108). If no matching entry is found, no words in the lexicon 22 can match the search string, and a null set is returned (steps 110, 112). Otherwise, the lower word number $WD_1$ is set to the value in column two of the word look-up table 24 corresponding to the identified character-length entry (step 114). Column one of the word look-up table 24 is then scanned downward to find the maximum character-length value within the selected length range (step 116). The upper word number $WD_n$ is set to the corresponding entry in column three of the word look-up table 24 (step 118). The first character-length value located in column one may in fact be the only entry within the selected length range, and columns two and three associated with that entry would then determine the range numbers $WD_1$ and $WD_n$. At this stage, the target set 32 is represented by the lower and upper word numbers $WD_1$ $WD_n$, and all words in the lexicon 22 that do not fall within the specified range have been excluded from the target set.

Figure 11:
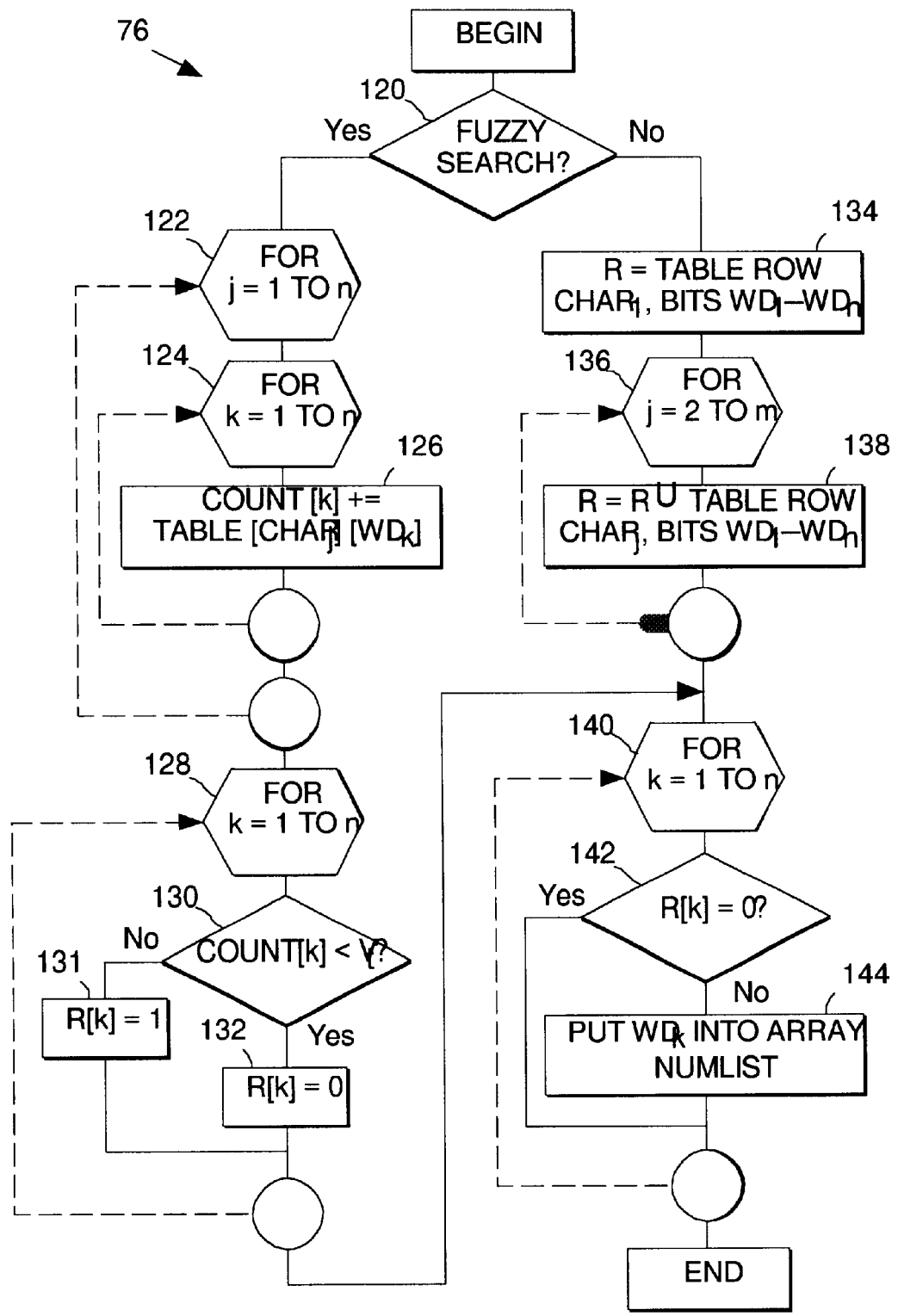
FIG. 11 is a flowchart illustrating a set refining process that uses the character look-up table together with the selected character set to refine the target set; and, FIG. 12 is a flowchart detailing how the set refining process can be adapted to process sets of words simultaneously.

Reference is made to FIG. 11 which diagrammatically illustrates the procedure 76 that accesses the character look-up table 26 in response to the selected character set to cull non-matching words from the preliminary target set 32. A general overview of the procedure 76 will be provided before examining procedure steps in greater detail. During the refining process, the target set 32 is represented by a bit string (identified as variable "R" in the flowcharts) comprising n-bits, one bit corresponding to each of the word numbers between $WD_1$ and $WD_n$ inclusive. An example of such a bit string is shown diagrammatically in FIG. 7 and identified with the reference number 54. The refining process excludes word numbers from the target set 32 by setting corresponding bits in R to 0. The procedure 76 produces a match value for each word number in the target set 32 that indicates the degree of correlation between the target word and the search string. The match value may be boolean, indicating whether the entire character set is contained in an associated target word, or may be numeric, such as a count indicating the number of selected characters matched in a particular target word. Before passing the refined target set to the string comparison module 36, the refining procedure 76 converts the bit string representation of the target set 32 into an array NUMLIST consisting of the actual word numbers remaining in the target set 32.

The procedure 76 branches according to the type of search being performed (step 120). If a fuzzy search is specified, the procedure 76 effectively examines the column of the character look-up table 26 associated with each word number $WD_1$ to $WD_n$ in the target set 32 and tallies the values in the rows corresponding to the selected characters $CHAR_1$–$CHAR_m$. The match values are tallied and stored in an array COUNT (steps 122, 124, 126). To reduce disk operations and speed execution, the procedure 76 loads a section of the table's row corresponding to a selected character $CHAR_j$ that contains only the consecutive array bits corresponding to the word numbers $WD_1$–$WD_n$, increments the match count for each word containing $CHAR_j$ (at steps 124, 126), and then repeats this process until match counts have been tallied for all selected characters $CHAR_1$–$CHAR_m$. The match COUNT[k] corresponding to each word number $WD_k$ is then compared with a preset threshold value $V_t$ (steps 128, 130). The word number $WD_k$ is excluded from the target set 32 if its COUNT[k] is not acceptable by setting bit R[k] of the set representation to 0 (step 132). Otherwise, bit R[k] is to 1, and the word number $WD_k$ remains in the target set 32 (step 131).

As an example, consider a fuzzy search intended to identify words in the lexicon 22 that loosely correspond to the word "ready." The starting character and length of the search string "ready" are identified as "r" and "5" (step 64, FIG. 8). A set of target word lengths is selected (procedure 66, FIG. 8) which may be the string length plus or minus two characters, namely, 3 to 7 characters. The word look-up table 24 is then accessed to identify a preliminary target set 32 consisting of consecutive word numbers whose associated words have character-length values in the range "r3" to "r7" (procedure 68, FIGS. 8 and 10), namely, word numbers 13–15. A character set is then selected (step 74, FIG. 1) consisting of the letters "a", "d", "e" and "y", namely, all characters in the search string except the starting character "r." It is assumed that the match threshold $V_t$ is set to 1, and that all match counts are initialized to 1 to reflect matching of the starting character "r." The refining procedure 76 then returns a word set and array COUNT identifying the following: word number 13 "ran" with a match value of 2 (letters "a" and "r" matched); word number 14 "red" with a match value of 3 (letters "d", "e", "r" matched); and word number 15 "rapidly" with a match value of 4 (letters "a", "d", "r" and "y" matched). It will be appreciated that this example cannot properly illustrate the value of a fuzzy search since the sample lexicon 22 is severely limited and since the length set together with the matching criterion have been artificially selected to avoid returning a null set for purposes of the example. It does show, however, how a relatively small set of loosely matching words, together with match values, can be quickly generated before the direct string comparison associated with a fuzzy search are performed.

The other branch of the set refining procedure 76 handles exact match, prefix and wildcard searches. A section of the row $CHAR_1$ of the character look-up table 26 containing only bits $WD_1$ to $WD_n$ is loaded from disk 18 into a result variable R (step 134). Similar sections of rows $CHAR_2$ to $CHAR_m$ are then loaded in succession and combined with R in logical AND operations (steps 136, 138). The result R is a sparse bit string (primarily 0 values) with a 1-bit corresponding to each word number in the target set 32 whose associated word contains the entire selected character set $CHAR_1$–$CHAR_m$.

The bit string representation of the target set 32 created by either branch of the refining procedure 76 is then converted into a list of word numbers, contained in the array NUMLIST, before passing of the set 32 to the string comparison module 36. The bits of the result R are examined, and any word associated with a 1-bit is placed placed in the list while any word associated with 0-bit is excluded (steps 140, 142, 144). The refined target set 32 as represented in list form in the array NUMLIST is then passed to the string comparison module. For a fuzzy search, values associated with non-matching entries are also culled from the array COUNT in a conventional manner before the arrays are passed to the string comparison module 36 (such culling not shown in the flowcharts).

The string comparison module 36 can then compare the remaining words with the search string STR and exclude any non-matching words. The refined target set 32 identifies only words in the lexicon 22 that have a high probability of matching the search string STR. In an exact match search, the word number set is in fact reduced to only a few words (sometimes just a single word) that begin with the same character, use the same character set, and have the same length as the search string. The comparisons can be performed in a conventional manner according to the type of search specified.

Figure 12:
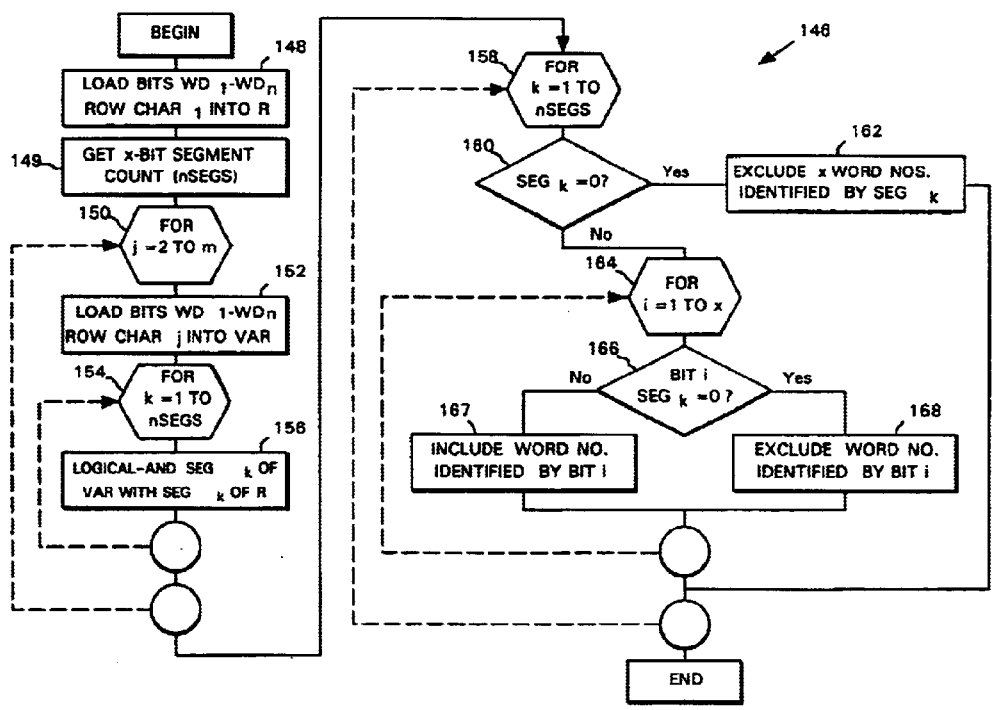

FIG. 12 shows a detailed implementation 146 of steps 134–144 of the set refining procedure 76 that culls multiple words from the target set 32 simultaneously. As before, a section of the row $CHAR_1$ of the character look-up table 26 containing only bits $WD_1$ to $WD_n$ is loaded from disk 18 into the result variable R (step 148). A digital processor normally makes different bit processing counts available for arithmetic and logical operations. For example, in a conventional 32-bit processor, such operations can normally be executed simultaneously on 8, 16 or 32 bits, according to a programmer's choice. A bit count x will be assumed, which may correspond to 8, 16, 32 or more bits. At step 149, the number of x-bit segments ("nSEGS") in the row section is identified. The count nSEGS is simply the integer value of $(WD_n-WD_1)/x$ plus 1 if the difference between the word numbers $WD_1, WD_n$ is not an even multiple of x. (Each bit row when loaded may be padded with trailing 0-bits to arrive at an even multiple of x to ensure the integrity of subsequent logical AND operations.) Corresponding sections of the rows associated with values $CHAR_2$ to $CHAR_m$ are then loaded in succession into a temporary variable designated VAR in FIG. 12 (steps 150, 152). The variables R and VAR are combined in a logical AND operation, leaving the result in variable R. The logical AND is executed simultaneously on each x-bit segment contained in the variables R and VAR (steps 154,156). If a 32-bit processing count is used, the selected character set is effectively compared with 32 words in the target set simultaneously, greatly speeding execution.

Steps 158 to 168 of FIG. 12 show how the bit string representation of the target set 32 defined by the variable R can be converted, for example, to a word list number defined by the array NUMLIST. The procedure 146 once again takes advantage of the bit-processing count x. The bit pattern associated with each x-bit segment (designated $SEG_k$ in FIG. 12) of the result R is tested in a single operation for an arithmetic 0 (steps 158, 160) in which case all x word numbers associated with the segment $SEG_k$ are excluded (step 162). For conversion to the array NUMLIST, the excluding 162 of all x word numbers simply involves skipping the current segment $SEG_k$. Otherwise, the individual bits of the segment $SEG_k$ are tested for specific bit values (steps 164, 166). If any bit is set to 1, the single word number that resulted in the 1-bit is included in the converted version of the target set 32, as by adding the word number to the array NUMLIST (step 167). Any word number associated with a 0-bit is excluded (step 168), as by simply omitting to record the word number in the array NUMLIST. Thus, if a 32-bit processing count is used, non-matching words are culled in groups of 32, unless a non-zero bit pattern is identified, in which case individual bits are examined. Accordingly, the culling process executes quickly.

Simplified examples of bit strings are shown in FIG. 7 to diagrammatically illustrate how the procedure 146 processes multiple words simultaneously. For purposes of this example, a bit processing count of only 4 (non-existent on contemporary processors) will be assumed. Also it will be assumed that the preliminary target set 32 consists of 14 word numbers $WD_1-WD_{14}$. A bit string corresponding to the current state of the result variable R is identified with reference number 54. The 14 bits of the variable R are identified with numbers 1 through 14 immediately above the bit string 54, and the bits corresponding to range-emitting word numbers $WD_1$ and $WD_{14}$ are also identified. An arbitrary row section of the character look-up table 26 to be combined with the variable R is identified with reference number 56, and the resulting bit string, with reference number 58. The bit strings 54, 56 are padded with trailing 0-bits (identified with bold "0" characters at bit positions 15 and 16) before AND operations, to make each row a multiple (specifically 16) of the bit processing count 4. A ghost outline rectangle 60 isolates the second 4-bit segment of each bit string 54, 56 or 58. Those bit segments of the bit strings 54, 56 would be combined simultaneously to produce the second 4-bit segment shown in bit string 58. The first, third and fourth segments of bit strings 54, 56 would be similarly combined.

The numeric values (0, 6, 2 or 0) associated with the four segments of the resulting bit string 58 are shown immediately below each segment. Since the first segment (bits 1 to 4) of the bit string 58 is an arithmetic 0, word numbers $WD_1$ to $WD_4$ could be immediately removed from the target set. Since the second segment of the resulting bit string 58 has an arithmetic value of 6, individual bits of the segment would be examined to eliminate word numbers $WD_5$ and $WD_8$. The third and four 4-bit segments are handled in the same manner. The process would be similar on a 32-bit processor except that groups of 32 words would be processed simultaneously.

The preferred refining procedure 146 may be modified to reduce the number of AND operations required. For example, at each iteration of the AND operation, the bit string representing the target set 32 can be checked for continuous strings of 0-bits at its upper and lower ends, and the size of the target set 32 can be reduced accordingly. Thus, at succeeding stages, a narrower range of bits is loaded into the variable VAR for each selected character, and AND operations are restricted to the narrower range. Also, during assembly of the character look-up table 26, values may be stored to identify upper and lower word number limits for each character value of the table 26. The stored values may then be retrieved when a character set is selected and used to identify, before AND operations begin, the narrowest range of word numbers that identifies all words potentially containing the selected characters. Thus, rather than loading all bits $WD_1-WD_n$ of each row of table 26 associated with the selected characters, a smaller section of each row corresponding to the narrower word number range is loaded and subjected to logical AND operations.

One aspect of wildcard searches should be noted. If a wildcard occupies the first character position in a search string, additional steps are required to identify the preliminary target set 32. With a wildcard that identifies a single character (which has been assumed throughout this specification), the length of the search string $L_{string}$, including the wildcard, is identified. A bit string representation of the target set 32 is composed from word number sets in the word look-up table 24 associated with any starting character and a word length matching $L_{string}$. For example, if $L_{string}$ is 4 characters, the preliminary target set 32 may be composed from word number sets corresponding to prefix-length values "a4", "b4", "c4" and so forth to "z4." If the starting wildcard identifies 0 or more characters (not discussed above), a length set may be specified that is bounded by the minimum and maximum lengths of a potentially matching word. The preliminary target set 32 may then be composed from word numbers sets in the word look-up table 24 associated with any starting character value and a word length within the specified range of lengths.

The advantages associated with the retrieval system 10 and the illustrated search procedures should be apparent. The preliminary target set 32 is identified according to characteristics of the search string, which immediately reduces the number of words that must considered. Owing to the manner in which word numbers are assigned and the tables are sorted, the target set generator 30 can quickly identify a set of consecutive word numbers that correspond to word length ranges, as required for prefix or fuzzy searches. The set refining module 34 quickly culls non-matching words from the target set 32 by accessing the character look-up table 26. With a conventional 32-bit processor, the preferred set refining procedure 146 handles words in groups of 32 during exact match, prefix and wildcard searches, making the culling process very fast. If the preliminary or refined target set 32 is empty, which will frequently be the case in practical searches, the system 10 reports the absence of any matching word without having performed a single direct string comparison. Disk operations are significantly reduced in number, as compared, for example, to a binary tree search, and small amounts of data are loaded during word set creation and refining. Moreover, the search process described permits various types of searches to be implemented with only minor variations in processing steps. The process may be extended to other searches, such as combined prefix-suffix searches, with similar advantages.

The invention has various applications beyond use in Web sites. The document management software 16 may be distributed on a processor-readable medium, such as a compact disk ("CD"), for general document indexing and retrieval. Parts of the software 16 may be distributed as a document viewer, specifically the target set generator 30, the set refining module 34, the string comparison module 36, and an adaption of the document retrieving module 38 appropriate for local retrieval and review of documents. Document sets of specific interest to particular users can then be distributed on a CD or other processor-readable medium together with corresponding versions of the lexicon 22, the word look-up table 24, the character look-up table 26, and the document look-up table 28. As well, if a user supplies a set of documents, a CD can be returned to the user that contains a lexicon and look-up tables tailored for those documents.

It will be appreciated that particular embodiments of the invention have been described and that various modifications can be made without necessarily departing from the scope of the appended claims.

The embodiments of the invention in which an exclusive property or privilege is claimed are defined as follows:

1. A method of matching a search string according to a predetermined set of matching criteria to a set of words contained in a collection of words, comprising:

creating and storing a lexicon containing the collection of words and associating each of the stored words with a unique identifying number;

creating and storing a word look-up table identifying sets of word numbers associated with words of the lexicon that have a common set of characteristics;

assigning the word numbers to the words of the lexicon such that each of the word number sets identified by the word look-up table consists of consecutive numbers;

creating and storing a character look-up table identifying for a specified word number and a specified character whether the word associated with the specified word number contains the specified character and wherein the character look-up table is a two-dimensional boolean array with one dimension corresponding to character values and the other dimension corresponding to word numbers;

selecting from the word look-up table a target set of word numbers whose associated words have a set of characteristics corresponding to the search string;

refining the target set, the refining comprising selecting a set of characters from the search string, accessing the character look-up table to identify which of the selected characters are contained in each of the words associated with the target set, and in response to the character identification excluding from the target set those word numbers whose associated words do not contain a predetermined number of the selected characters;

comparing each of the words associated with the refined target set directly with the search string and excluding from the target set any word number whose associated word fails to match the search string according to the predetermined set of matching criteria;

each element of the array consists of a single bit, and the elements of the array corresponding to any character value of the one dimension are stored side-by-side in a row;

the selecting of the target set comprises composing a set of consecutive word numbers from one or more word sets identified by the word look-up table;

the accessing of the character look-up table comprises generating a boolean match value for each of the word numbers in the target set which indicates whether all of the selected characters are contained in the word associated with the word number; and, the generating of the boolean values comprising performing a logical AND operation that combines sections of each of the rows of the character look-up table corresponding to the selected characters and to the word numbers of the target set thereby to produce a resulting bit string in which each bit is associated with one of the word numbers of the target set and contains the boolean value for the associated word number, the performing of the logical AND operation comprising simultaneously combining n-bit segments of the row sections;

whereby, the boolean match values are generated simultaneously for n words associated with the target set.

2. The method of claim 1 in which the excluding of word numbers during refining of the target set comprises, for each n-bit segment of the resulting bit string;

checking the n bits of the segment simultaneously to determine whether the segment defines a number 0; and, excluding from the target set the n word numbers associated with the bits of the segment if the segment defines a numeric 0 and otherwise checking the state of each of the bits and excluding any word number associated with a 0 bit.

3. A method of matching a search string according to a predetermined set of matching criteria to a set of words contained in a collection of words, comprising:

creating and storing a lexicon containing the collection of words and associating each of the words with a unique identifying number;

creating and storing a word look-up table identifying sets of word numbers, each of the word number sets identifying words of the lexicon that have a common prefix value and a common word length;

assigning the word numbers consecutively to the words of the lexicon ordered primarily according to prefix value and secondarily according to word length whereby each of the word sets identified by the word look-up table consists of consecutive word numbers;

creating and storing a character look-up table identifying for a specified word number and a specified character whether the word associated with the specified word number contains the specified character;

accessing the word-look up table to compose a target set of word numbers whose associated words have the same prefix value as the search string and have word lengths corresponding to the length of the search string according to the predetermined set of matching criteria;

identifying the prefix value and the length of the search string;

selecting a set of consecutive word lengths corresponding to the length of the search string;

accessing the word look-up table to identify a set of consecutive word numbers that identify all words in the lexicon having the same prefix value as the search string and having a word length in the selected set of word lengths;

refining the target set, the refining comprising selecting a set of characters from the search string, accessing the character look-up table to identify which of the selected characters are contained in each of the words associated with the target set, and in response to the character identification excluding from the target set those word numbers whose associated words do not contain a predetermined number of the selected characters; and, comparing each of the words associated with the refined target set directly with the search string and excluding from the target set any word number whose associated word fails to match the search string according to the predetermined set of matching criteria;

the character look-up table is a two-dimensional boolean array with one dimension corresponding to character values and the other dimension corresponding to the word numbers assigned to the words of the lexicon;

each element of the array consists of a single bit, and the elements corresponding to any character value of the one dimension are stored side-by-side in a row;

the accessing of the character look-up table comprises generating a boolean match value for each of the word numbers in the target set that indicates whether all of the selected characters are contained in the word associated with the word number; and, the generating of the boolean values comprises performing a logical AND operation that combines sections of each of the rows of the character look-up table corresponding to the selected characters and to the word numbers of the target set thereby to produce a resulting bit string that contains the boolean values, the performing of the logical AND operation comprising simultaneously combining n-bit segments of each of the row sections;

whereby, the boolean match values are generated simultaneously for n words associated with the target set.

4. The method of claim 3 in which the excluding of word numbers during refining of the target set comprises:

checking n-bit sets of the resulting bit string simultaneously to determine whether each of the n-bit sets defines a numeric 0;

excluding from the target set the n word numbers associated with any of the n-bit sets that defines a numeric 0; and, checking the state of each of the bits in any of the n-bit sets that does not define a numeric 0 and excluding any word number associated with a 0-bit of the n-bit set.

5. The method of claim 3 in which the common prefix value of the words associated with each of the word number sets identified by the work look-up table consists solely of the value of the first character of each of the words.

6. A computer-operated document retrieval system adapted to retrieve documents in response to a search string that specifies a set of words to be found in a document of interest and in response to instructions specifying a predetermined search type, the system comprising:

digital storage means storing;

a collection of documents;

a lexicon comprising words contained in the collection of documents and associating each of the words with a unique number;

a word look-up table identifying sets of word numbers associated with words of the lexicon that have a common set of predetermined characteristics; each of the word number sets identified by the word look-up table, the set of characteristics of the associated words comprises a common prefix value and a common word length;

a character look-up table identifying for a specified word number and a specified character whether the word in the lexicon associated with the specified word number contains the specified character; and which the character look-up table is a two-dimensional boolean array with one dimension corresponding to character values and the other dimension corresponding to the word numbers assigned to the words of the lexicon;

a document look-up table relating the word numbers of the lexicon to ones of the stored documents containing the words;

set generating means for accessing the word look-up table to compose a target set of word numbers in response to the specified search type and a set of characteristics of the search string;

set refining means for refining the target set, the set refining means programmed to select a character set consisting of characters in the search string, to access the character look-up table to identify which of the selected characters are contained in each of the words associated with the target set, and to exclude from the target set any word number whose associated word contains less than a predetermined number of the selected characters and wherein the word numbers are assigned consecutively to the words of the lexicon primarily according to the word prefix value and secondarily according to word length such that each of the word number sets identified by the word look-up table consists of consecutive word numbers; and, the set generating means are programmed to compose in response to a specified prefix value and a specified range of consecutive word lengths, a set of consecutive word numbers whose associated words correspond to the specified prefix value and whose lengths lie in the specified range of word lengths;

comparison means for comparing the search string with each of the words associated with the target set and excluding from the target set any word number whose associated word does not match the search string according to a set of matching criteria determined by the specified search type; and, retrieval means for accessing the document look-up table to identify and retrieve documents related to the word numbers of the target set; and each of the elements of the array is a single bit, and the elements of the array corresponding to any character value of the one dimension are stored side-by-side in a row; and, the set refining means are programmed to generate a boolean value for each of the word numbers in the target set that indicates whether all of the selected characters are contained in the word associated with the word number, the set refining means generating the boolean values by performing a logical AND operation that combines sections of each of the rows of the character look-up table corresponding to the selected characters and to the word numbers of the target set thereby to produce a resulting bit string in which each bit is associated with one of the word numbers of the target set and contains the boolean value for the associated word number, the set refining means performing the logical AND operation by simultaneously combining n-bit segments of the row sections whereby the boolean values are simultaneously generated for n word numbers of the target set.

7. The documents retrieval system of claim 6 in which the set refining means are programmed, for each n-bit segment of the resulting bit string:

to check the n bits simultaneously to determine whether the segment defines a number 0; and, to exclude the n word numbers associated with the bits of the segment from the target set if the segment defines a number 0 and otherwise to check the state of each of the bits of the segment and exclude from the target set any word number associated with a 0 bit.

8. A product for enabling a digital processor coupled to a digital storage medium to match a search string according to a predetermined set of matching criteria to a set of words contained in a collection of words, the product comprising a processor-readable medium containing program code for operating the processor, the program code defining means for:

creating and storing in the digital storage medium a lexicon containing the collection of words and associating each of the stored words with a unique identifying number;

creating and storing in the digital storage medium a word look-up table identifying word number sets consisting of word numbers associated with words of the lexicon that have a common set of characteristics;

for each of the word number sets identified by the word look-up table, the set of characteristics of the associated words comprises a common prefix value and a common word length;

assigning the word numbers consecutively to the words of the lexicon primarily according to prefix value and secondarily according to word length whereby each of the word sets identified by the word look-up table consists of consecutive word numbers;

creating and storing in the digital storage medium a character look-up table identifying for a specified word number and a specified character whether the word associated with the specified word number contains the specified character;

selecting a target set of word numbers from the word look-up table whose associated words have a set of characteristics corresponding to the search string;

identifying the prefix value and the length of the search string;

selecting a set of consecutive word lengths corresponding to the length of the search string; and, accessing the word look-up table to identify a set of consecutive word numbers that identify all words in the lexicon having the same prefix value as the search string and having a word length in the selected set of word lengths;

refining the target set, the refining comprising selecting a set of characters from the search string, accessing the character look-up table to identify which of the selected characters are contained in each of the words associated with the target set, and in response to the character identification excluding from the target set those word numbers whose associated words do not contain a predetermined number of the selected characters; and, comparing each of the words associated with the refined target set directly with the search string and excluding from the target set any word number whose associated word fails to match the search string according to the predetermined set of matching criteria;

the character look-up table is a boolean array in which each element of the array consists of a single bit and in which the elements corresponding to any character value of the one dimension are stored side-by-side in a row;

the accessing of the character look-up table comprises generating a boolean match value for each of the word numbers in the target set that indicates whether all of the selected characters are contained in the word associated with the word number; and, the generating of the boolean values comprises performing a logical AND operation that combines sections of each of the rows of the character look-up table corresponding to the selected characters and to the word numbers of the target set thereby to produce a resulting bit string in which each bit is associated with one of the word numbers of the target set and contains the boolean value for the associated word number, the performing of the logical AND operation comprising simultaneously combining n-bit segments of each of the row sections;

whereby, the boolean match values are generated simultaneously for n words associated with the target set.

9. The product of claim 8 in which the excluding of word numbers during refining of the target set comprises, for each n-bit segment of the resulting bit string;

checking the n bits of the segment simultaneously to determine whether the segment defines a numeric 0; and, excluding from the target set the n word numbers associated with the bits of the segment if the segment defines a numeric 0 and otherwise checking the state of each of the bits and excluding any word number associated with a 0 bit.

10. The product of claim 9 in which the prefix value for each of the words of the lexicon consists solely of the value of the first character of the word.

11. The product of claim 8 in which the word-look up table comprises, for each of the word number sets identified by the word look-up table:

an entry identifying the prefix value and length of the word set; and, a pair of entries identifying a lower word number and an upper word number defining the word number set.

12. A product for enabling a digital processor to retrieve among a collection of documents a set of documents containing a set of words that match a search string according to a predetermined set of search criteria, the collection of documents stored together with a lexicon, a word look-up table, a character look-up table and a document look-up table in a digital storage device coupled to the processor, the lexicon containing a collection of words found in the documents and associating each of the collected words with a unique identifying number, the word look-up table identifying sets of word numbers associated with words of the lexicon that have a common set of characteristics, the character look-up table identifying for a specified word number and a specified character whether the word associated with the specified word number contains the specified character, and the document look-up table relating each of the word numbers to those documents of the collection of documents that contain the word associated with the word number, the product comprising a processor-readable medium containing program code that defines;

set generating means responsive to the search string and to the search criteria for accessing the word look-up table to compose a target set of word numbers whose associated words have a set of characteristics corresponding to the search string;

the set generating means are programmed to compose, in response to a specified prefix value and a specified set of consecutive word lengths, a set of consecutive word numbers whose associated words correspond to the specified prefix value and whose lengths are contained in the specified set of word lengths;

set refining means for refining the target set, the set refining means programmed to select a character set consisting of characters in the search string, to access the character look-up table to identify which of the selected characters are contained in each of the words associated with the target set, and to exclude from the target set any word number whose associated word contains less than a predetermined number of the selected characters;

the set refining means are programmed to generate a boolean value for each of the word numbers in the target set that indicates whether all of the selected characters are contained in the word associated with the word number, the set refining means generating the boolean values by performing a logical AND operation that combines sections of each of the rows of the character look-up table corresponding to the selected characters and to the word numbers of the target set thereby to produce a resulting bit string in which each bit is associated with one of the word numbers of the target set and contains the boolean value for the associated word number, the set refining means performing the logical AND operation by simultaneously combining n-bit segments of the row sections whereby the boolean values are simultaneously generated for n word numbers of the target set;

comparison means for comparing the search string with each of the words associated with the target set and excluding from the target set any word number whose associated word does not match the search string according to a set of matching criteria determined by the set of search criteria; and, retrieval means for accessing the document look-up table to identify and retrieve documents related to the word numbers of the target set.

13. The product of claim 12 in which the set refining means are programmed, for each n-bit segment of the resulting bit string:

to check the n bits simultaneously to determine whether the segment defines a numeric 0; and, to exclude the n word numbers associated with the bits of the segment from the target set if the segment defines a numeric 0 and otherwise to check the state of each of the bits of the segment and exclude from the target set any word number associated with a 0 bit.

* * * * *